United States Patent
Donovan

(10) Patent No.: US 11,167,475 B2
(45) Date of Patent: Nov. 9, 2021

(54) GENERATING THREE-DIMENSIONAL OBJECTS

(71) Applicant: Hewlett-Packard Development Company, L.P., Houston, TX (US)

(72) Inventor: David H. Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 949 days.

(21) Appl. No.: 15/111,949

(22) PCT Filed: Mar. 31, 2014

(86) PCT No.: PCT/US2014/032341
§ 371 (c)(1),
(2) Date: Jul. 15, 2016

(87) PCT Pub. No.: WO2015/108552
PCT Pub. Date: Jul. 23, 2015

(65) Prior Publication Data
US 2016/0332366 A1   Nov. 17, 2016

(30) Foreign Application Priority Data
Jan. 16, 2014   (WO) .................. PCT/EP2014/050841

(51) Int. Cl.
*B33Y 30/00* (2015.01)
*B29C 64/153* (2017.01)
(Continued)

(52) U.S. Cl.
CPC .......... *B29C 64/153* (2017.08); *B29C 64/135* (2017.08); *B29C 64/165* (2017.08);
(Continued)

(58) Field of Classification Search
CPC ............ B29C 67/0066; B29C 67/0051; B29C 67/0077; B29C 67/0081; B29C 67/0088; B29C 67/0092; B33Y 30/00; B33Y 50/00
See application file for complete search history.

(56) References Cited

U.S. PATENT DOCUMENTS 6,799,959 B1 * 10/2004 Tochimoto .............. B29C 41/12
                                                         425/130
6,815,636 B2   11/2004 Chung et al.
(Continued)

FOREIGN PATENT DOCUMENTS

CN   1789928 A   6/2006
DE   4112695 A1  7/1992
(Continued)

OTHER PUBLICATIONS

International Search Report and Written Opinion dated Oct. 13, 2014, PCT Patent Application No. PCT/US2014/032341 filed Mar. 31, 2014, International Searching Authority.
(Continued)

*Primary Examiner* — Yung-Sheng M Tsui
(74) *Attorney, Agent, or Firm* — HP Inc. Patent Department

(57) ABSTRACT

A three-dimensional object may be generated. A controller may be to control an energy source to apply energy to a layer of build material on a support member or previous layer to cause a portion of the layer to coalesce and solidify to form a slice of the three-dimensional object. A radiation sensor may be to measure absorbance or gloss of the layer. The controller may be to receive, from the radiation sensor, data representing measured absorbance or measured gloss of the layer. The controller may be to control the apparatus to
(Continued)

modify a process parameter if the measured absorbance or gloss indicates an incorrect degree of solidification of a part of the layer.

20 Claims, 6 Drawing Sheets

(51) Int. Cl.
  *B33Y 50/02* (2015.01)
  *B29C 64/165* (2017.01)
  *B29C 64/135* (2017.01)
  *B29C 64/40* (2017.01)
(52) U.S. Cl.
  CPC ............... *B33Y 30/00* (2014.12); *B33Y 50/02* (2014.12); *B29C 64/40* (2017.08)

(56) References Cited

U.S. PATENT DOCUMENTS

| | | | |
|---|---|---|---|
| 2002/0086247 A1* | 7/2002 | Coe | B33Y 50/02 430/328 |
| 2004/0133298 A1* | 7/2004 | Toyserkani | B23K 26/032 700/166 |
| 2006/0249884 A1 | 11/2006 | Partanen et al. | |
| 2009/0152771 A1* | 6/2009 | Philippi | B33Y 10/00 264/410 |
| 2010/0167191 A1* | 7/2010 | Black | G03G 5/047 430/58.05 |
| 2011/0032301 A1 | 2/2011 | Fienup | |
| 2011/0069301 A1 | 3/2011 | Marzok et al. | |

FOREIGN PATENT DOCUMENTS

| | | |
|---|---|---|
| DE | 102011009624 A1 | 8/2012 |
| DE | 102011012412 A1 | 8/2012 |
| DE | 202010010771 U1 | 11/2012 |
| EP | 1452298 A1 | 9/2004 |
| JP | 2010-090350 A | 4/2010 |
| JP | 2011-099023 A | 5/2011 |
| WO | WO-2006091842 A1 | 8/2006 |
| WO | WO-2007147221 | 12/2007 |
| WO | WO2008151063 A2 | 12/2008 |
| WO | WO-2013030064 A1 | 3/2013 |
| WO | WO-2013098054 A1 | 7/2013 |

OTHER PUBLICATIONS

Wegner, A. et al., Process Monitoring in Laser Sintering Using Thermal Imaging, Aug. 29, 2011, Institute for Product Engineering, Univeristy of Duisburg Essen, Germany, pp. 40.

* cited by examiner

GENERATING THREE-DIMENSIONAL OBJECTS

CLAIM FOR PRIORITY

The present application is a national stage filing under 35 U S C. § 371 of PCT application number PCT/US2014/032341, having an international filing date of Mar. 31, 2014, which claims the benefit of priority from PCT application number PCT/EP2014/050841, having a filing date of Jan. 16, 2014, the disclosures of which are hereby incorporated by reference in their entireties.

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Using an additive manufacturing system, a three-dimensional object may be generated through the solidification of portions of one or more successive layers of build material. The build material can, for example, be powder-based or be a liquid, and the properties of generated objects are dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In other examples, other methods of solidification may be used.

However, build material may experience an incorrect degree of solidification, as in the following examples. In one example, build material having coalescing agent may under-solidify, e.g. may not completely coalesce and solidify as intended, resulting in poor object properties, such as poor surface properties, accuracy, strength, or inter-layer bonding. In another example, build material having coalescing agent may over-solidify, e.g. solidify to a greater extent than intended. In yet other examples, in an effect called coalescence bleed, over-solidification may occur in build material (1) which does not have coalescing agent thereon, (2) in which solidification was not desired, and (3) which is adjacent to build material on which solidification is desired.

Accordingly, the present disclosure may allow three-dimensional objects to be created in which high quality object properties may be achieved by determining a degree of solidification of build material by measuring optical properties, such as absorbance or gloss, from the build material. Using the measurement, aspects of the build process may be modified to help ensure that build material is suitably solidified. "Absorbance", also known as "optical density", is a ratio between radiation falling on a material and radiation transmitted through the material or reflected by the material. The absorbance may be calculated according to the formula:

$$\text{absorbance} = -\log\left(\frac{\text{light reflected}}{\text{light impinging}}\right).$$

"Gloss" is an optical property of a surface to reflect radiation in a specular, i.e. mirror-like, direction.

Figure 1:
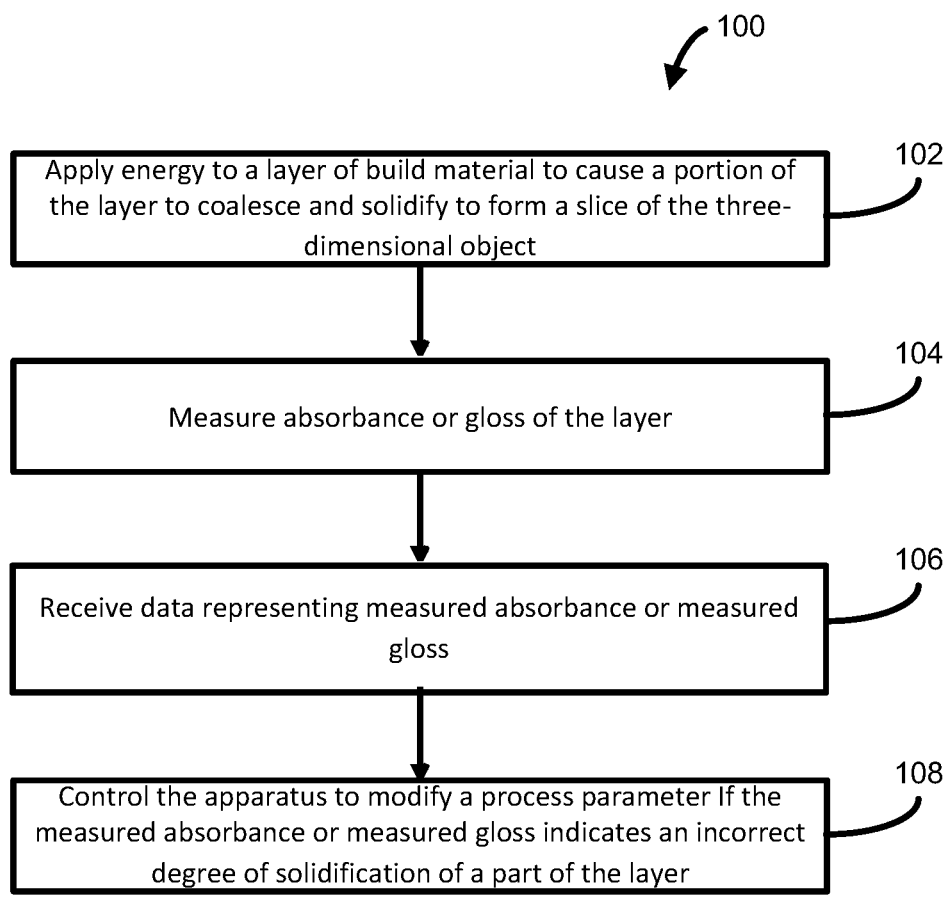
FIGS. 1 and 3 are flow diagrams illustrating methods of generating three-dimensional objects according to some examples.

FIG. 1 is a flow diagram illustrating a method 100 of generating a three-dimensional object according to some examples. The method 100 may, for example, be implemented by a system comprising a radiation sensor and a controller. At 102, the controller may control an energy source to apply energy to a layer of build material to cause a portion of the layer to coalesce and solidify to form a slice of the three-dimensional object. At 104, the radiation sensor may measure absorbance or gloss of the layer. At 106, the controller may receive, from the radiation sensor, data, e.g. a signal, representing measured absorbance or measured gloss. At 108, the controller may control the apparatus to modify a process parameter if the measured absorbance or gloss indicates an incorrect degree of solidification of a part of the layer.

As understood herein, "modifying a process parameter" or a variant thereof means that that corrective action may be taken to modify object properties of the three-dimensional object being generated so as to achieve desired object properties. As will be discussed in more detail, examples of modifying a process parameter may include selectively delivering coalescence modifier agent to the part, varying temperature of the build material, or varying duration or intensity of the energy applied to the build material.

Figure 2A:
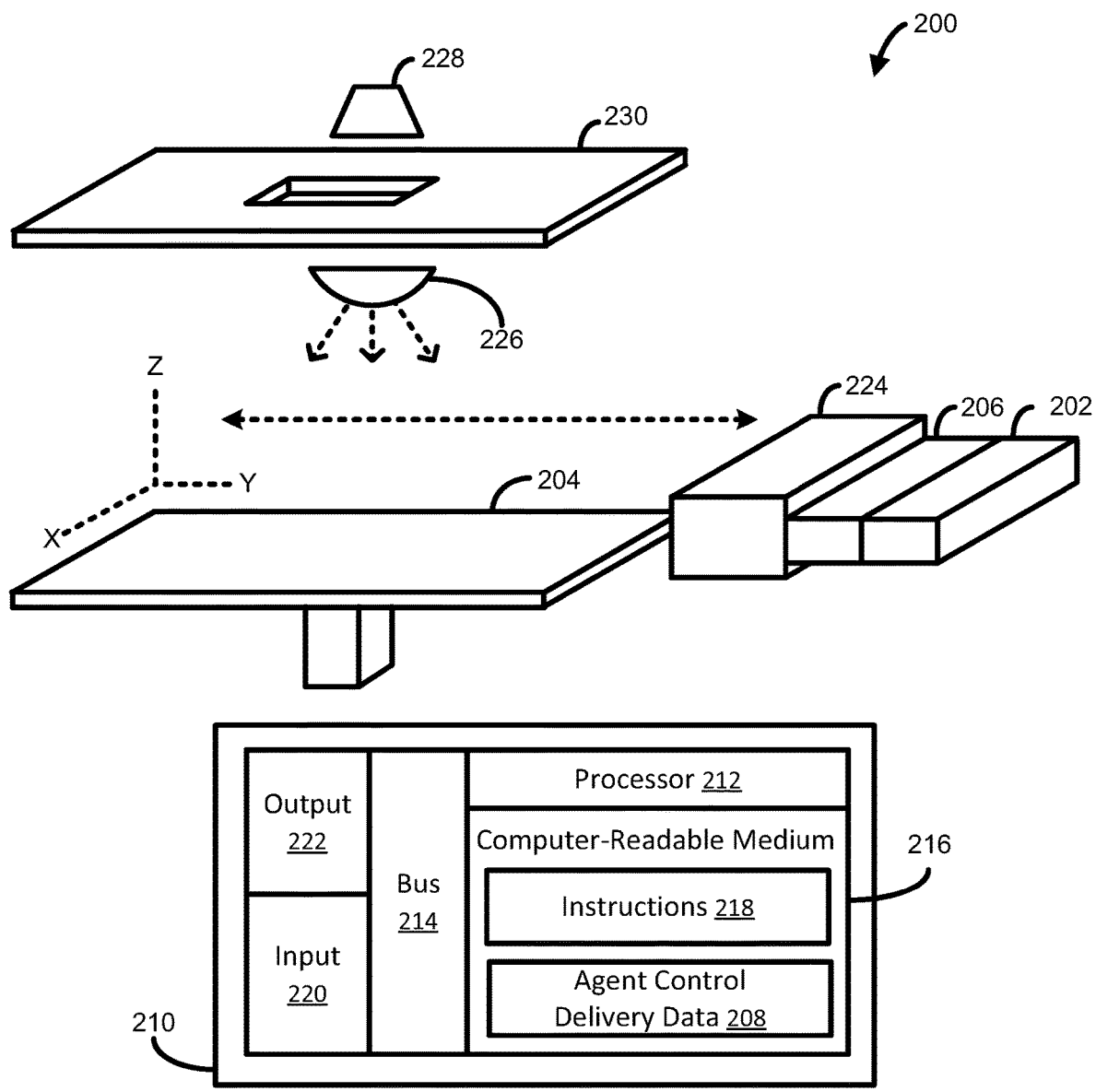
FIG. 2a is a simplified isometric illustration of an additive manufacturing system according to some examples.

FIG. 2a is a simplified isometric illustration of an additive manufacturing system 200 according to some examples. The system 200 may be operated, as described further below with reference to the flow diagram of FIG. 3, to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

In some examples, many of the build material above, such as powders, may exhibit different optical properties, such as different absorbance and different gloss, depending on the degree of solidification of build material, such as whether the build material is or is not solidified. This may allow determining, based on measured optical properties, whether build material has solidified as intended. Degree of solidification may be related to a number of other object properties, including density, strength, elastic modulus, and mechanical performance such as the degree of elongation the object can sustain without breaking. Thus, based on measured optical properties, the degree of each of these object properties may also be determined. For example, the degree of absorbance and the degree of gloss may each be positively correlated with each of the foregoing object properties.

In some examples, if the build material is not solidified, then it may exhibit little or no absorbance and little or no gloss in the presence of a suitable radiation source that emits radiation to the build material. These optical properties may result because of opacity resulting from scattering of radiation between parts of an irregular surface of the build material and between the large number of interfaces between the build material and air, such as between a powder's particles and air voids throughout the powder. If the build material is solidified, then it may exhibit greater absorbance and greater gloss relative to a non-solidified build material. Greater absorbance may result because of greater transparency to radiation e.g. infra-red radiation, for example due to reduced scattering of radiation, causing the radiation to travel deeper into the build material and become absorbed therein, causing the solidified area to look darker. Greater gloss may result, for example, because the build material may have a smoother surface than prior to solidification.

In some examples, coalescing agent is delivered to build material, after which the build material having the coalescing agent is solidified when energy is applied. Different types of coalescing agents may have different effects on absorbance, as follows.

In some examples using a radiation absorbing coalescing agent, the agent may cause additional absorption of radiation that is transmitted within the build material, further darkening the solidified area. For example, after delivering coalescing agent but prior to applying energy for solidification, the un-solidified build material may exhibit greater absorbance than un-solidified build material on which coalescing agent was not delivered. This may be because the coalescing agent, upon being delivered into the build material, may be at least partially disposed on the surface of the build material, such that the coalescing agent may act as an absorber and absorb the radiation, thereby increasing absorbance. Carbon black, for example, may be an ingredient of a radiation absorbing coalescing agent that may remain at least partially on the surface of the build material. However, in some examples, the coalescing agent penetrates into the build material or is covered by additional build material such that it is buried and interspersed inside the build material. In such cases, the coalescing agent does not affect non-solidified build material's surface characteristics, which may be responsible for the low absorbance.

After applying energy for solidification, the absorbance of the solidified build material may increase. For example, radiation may pass through the solidified build material's surface, which may be transparent to the radiation after solidification, and reach the coalescing agent buried and interspersed inside the build material. The coalescing agent may act as an absorber and absorb the radiation, thereby increasing absorbance. In any of these examples, there may remain a significant difference in absorbance in un-solidified versus solidified build material.

In examples in which coalescing agent is not used, un-solidified build material may, for example, have an absorbance between about 0.1 and about 0.2 optical density (OD) units, and solidified build material may have an absorbance of about 0.4 OD units.

In examples in which coalescing agent is used that includes carbon black, the change in absorbance between the non-solidified and solidified build material may, for example, be greater than above. For example, un-solidified build material on which coalescing agent including carbon black may have an absorbance between about 0.5 and about 1.0 OD units, and solidified build material incorporating carbon black from coalescing agent may have an absorbance between about 1.3 and about 1.8 OD units. In examples in which radiation absorbing coalescing agent is used that also becomes incorporated in the build material, the change in absorbance may be even greater. This may allow measured absorbance to serve as an accurate indicator of object properties.

However, in other examples, the absorbance may achieve other values than those listed above.

In some examples using a coalescing agent that does not absorb the radiation used for detection, such as visible light, absorbance may not be affected, because the radiation may pass through the coalescing agent. Thus, un-solidified build material having coalescing agent may exhibit absorbance similar to that exhibited by un-solidified build material on which coalescing agent was not delivered. Additionally, in some examples, solidified build material having coalescing agent may exhibit absorbance similar to that exhibited by solidified build material on which coalescing agent was not delivered.

In some examples, un-solidified build material having coalescing agent may exhibit gloss similar to that exhibited by un-solidified build material on which coalescing agent was not delivered. Additionally, in some examples, solidified build material having coalescing agent may exhibit gloss similar to that exhibited by solidified build material on which coalescing agent was not delivered. This may be true regardless of whether coalescing agent settles on the surface of the build material, or penetrates into the build material.

In some examples, some build materials, such as liquids, may instead show a negative, rather than positive, correlation between degree of solidification and absorbance, and between degree of solidification and gloss. This may, for example, be because solidification causes increased roughness on the surface of the liquid build material.

The additive manufacturing system 200 may include a system controller 210. Any of the operations and methods disclosed herein may be implemented and controlled in the additive manufacturing system 200 and/or controller 210.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as one or more of a keyboard, touchpad, buttons, keypad, dials, mouse, track-ball, card reader, or other input devices. Additionally, the additive manufacturing system 200 may include output devices 222 coupled to the processor 212, such as one or more of a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light absorbers are dye based colored ink and pigment based colored ink, such as inks commercially known as CM993A and CE042A available from Hewlett-Packard Company.

The system 200 may also include a coalescence modifier agent distributor 206 to selectively deliver coalescence modifier agent to a layer of build material provided on the support member 204. A coalescence modifier agent may serve to modify, e.g. reduce or increase, the degree of coalescence of a portion of build material on which the coalescence modifier agent has been delivered or has penetrated. Different physical and/or chemical effects may be used to modify the effects of a coalescing agent. An example of a coalescence modifier agent that may reduce the degree of coalescence may, for example, be a colloidal ink, a fully water soluble ink, a polymer-based ink, a salt solution, or an agent comprising a high percentage of water. An example of a coalescence modifier agent that may increase the degree of coalescence may, for example, be a surface tension modifier to increase the wettability of particles of build material, or a suitable plasticizer.

In one example the support member 204 has dimensions in the range of from about 10 cm by 10 cm up to 100 cm by 100 cm. In other examples the support member 204 may have larger or smaller dimensions. The support member 204 may be a fixed part of the system 200, or may not be a fixed part of the system 200, instead being, for example, a part of a removable module.

The controller 210 controls the selective delivery of coalescing agent to a layer of provided build material in accordance with instructions comprising agent delivery control data 208.

The agent distributors 202 and 206 may be printheads, such as thermal printheads or piezo inkjet printheads. The printheads may have arrays of nozzles. In one example, printheads such as those commonly used in commercially available inkjet printers may be used. In other examples, the agents may be delivered through spray nozzles rather than through printheads. Other delivery mechanisms may be used as well.

The agent distributors 202 and 206 may be used to selectively deliver, e.g. deposit, coalescing agent and coalescence modifier agent when in the form of suitable fluids such as liquids. In some examples, the agent distributors 202 and 206 may be selected to deliver drops of agent at a resolution of between 300 to 1200 dots per inch (DPI), for example 600 DPI. In other examples the agent distributors 202 and 206 may be selected to be able to deliver drops of agent at a higher or lower resolution. In some examples, the agent distributors 202 and 206 may have an array of nozzles through which the agent distributors 202 and 206 are able to selectively eject drops of fluid. In some examples, each drop may be in the order of about 10 pico liters (pl) per drop, although in other examples agent distributors 202 and 206 that are able to deliver a higher or lower drop size may be used. In some examples agent distributors 202 and 206 that are able to deliver variable size drops may be used.

In some examples the coalescing agent may comprise a liquid carrier, such as water or any other suitable solvent or dispersant, to enable it to be delivered via a printhead.

In some examples the printhead may be a drop-on-demand printhead. In other examples the printhead may be a continuous drop printhead.

In some examples, the agent distributors 202 and 206 may be an integral part of the system 200. In some examples, the agent distributors 202 and 206 may be user replaceable, in which case they may be removably insertable into a suitable agent distributor receiver or interface module of the system 200.

In some examples a single agent distributor, such as a printhead, may be used to selectively deliver both coalescing agent and coalescence modifier agent. For example, a first set of nozzles of the agent distributor may be configured to deliver coalescing agent, and a second set of nozzles of the agent distributor may be configured to deliver coalescence modifier agent.

In the example illustrated in FIG. 2a, the agent distributors 202 and 206 have a length that enables them to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributors 202 and 206 may have a shorter length that does not enable them to span the whole width of the support member 204.

The agent distributors 202 and 206 may be mounted on a moveable carriage to enable them to move bi-directionally across the length of the support 204 along the illustrated y-axis. This enables selective delivery of coalescing agent and coalescence modifier agent across the whole width and length of the support 204 in a single pass. In other examples the agent distributors 202 and 206 may be fixed, and the support member 204 may move relative to the agent distributors 202 and 206.

It should be noted that the term 'width' used herein is used to generally denote the shortest dimension in the plane parallel to the x and y axes illustrated in FIG. 2a, whilst the term 'length' used herein is used to generally denote the longest dimension in this plane. However, it will be understood that in other examples the term 'width' may be interchangeable with the term 'length'. For example, in other examples the agent distributors 202 and 206 may have a length that enables them to span the whole length of the support member 204 whilst the moveable carriage may move bi-directionally across the width of the support 204.

In another example the agent distributors 202 and 206 do not have a length that enables them to span the whole width of the support member but are additionally movable bi-directionally across the width of the support 204 in the illustrated x-axis. This configuration enables selective delivery of coalescing agent and coalescence modifier agent across the whole width and length of the support 204 using multiple passes. Other configurations, however, such as a page-wide array configuration, may enable three-dimensional objects to be created faster.

The coalescing agent distributor 202 may include a supply of coalescing agent or may be connectable to a separate supply of coalescing agent. The coalescence modifier agent distributor 206 may include a supply of coalescence modifier agent or may be connectable to a separate supply of coalescence modifier agent.

The system 200 may further comprise a build material distributor 224 to provide, e.g. deliver and/or deposit, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module.

In some examples, the thickness of each layer may have a value selected from the range of between about 50 to about 300 microns, or about 90 to about 110 microns, or about 250 microns, although in other examples thinner or thicker layers of build material may be provided. The thickness may be controlled by the controller 210, for example based on the agent delivery control data 208.

In some examples, there may be additional coalescing agent distributors, coalescence modifier agent distributors, and build material distributors relative to the distributors shown in FIG. 2a. In some examples, the distributors of system 200 may be located on the same carriage, either adjacent to each other or separated by a short distance. In other examples, two or more carriages each may contain one or more distributors. For example, each distributor may be located in its own separate carriage. Any additional distributors may have similar features as those discussed earlier with reference to the coalescing agent distributor 202. However, in some examples, different agent distributors may deliver different coalescing agents, for example.

In the example shown the support 204 is moveable in the z-axis such that as new layers of build material are deposited a predetermined gap is maintained between the surface of the most recently deposited layer of build material and lower surface of the agent distributors 202 and 206. In other examples, however, the support 204 may not be movable in the z-axis and the agent distributors 202 and 206 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material, for example in accordance with agent delivery control data 208. For example, the controller 210 may control the energy source only to apply energy to portions of build material on which coalescing agent has been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that, excluding the effects of any coalescence bleed: i) portions of the build material on which no coalescing agent have been delivered do not coalesce when energy is temporarily applied thereto; ii) portions of the build material on which only coalescing agent has been delivered or has penetrated coalesce when energy is temporarily applied thereto do coalesce; iii) portions of the build material on which only coalescence modifier agent has been delivered or has penetrated do not coalesce when energy is temporarily applied thereto; and iv) portions of the build material on which both coalescing agent and coalescence modifier agent have been delivered or have penetrated may undergo a modified degree of coalescence. The degree of modification may depend on the properties, proportions, and delivery patterns of the coalescing agent and the coalescence modifier agent, the properties of the build material, and the chemical interactions between the coalescing agent, coalescence modifier agent, and build material.

Figure 2B:
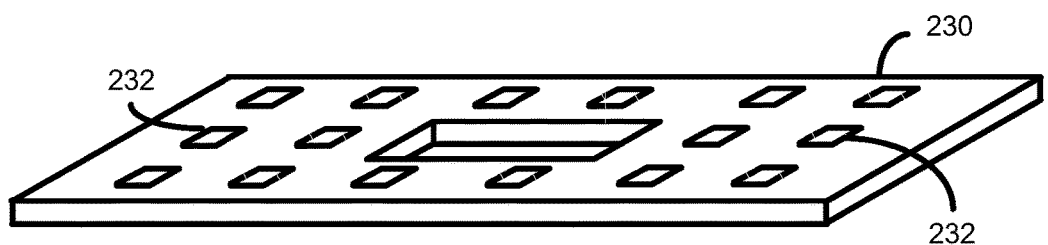
FIG. 2b is a simplified isometric illustration of a heater for an additive manufacturing system according to some examples.

The system 200 may additionally include a heater 230 to emit heat to maintain build material deposited on the support 204 within a predetermined temperature range. The heater 230 may have any suitable configuration. One example is shown in FIG. 2b, which is a simplified isometric illustration of a heater 230 for an additive manufacturing system according to some examples. The heater 230 may have an array of heating elements 232, as shown in FIG. 2B. The heating units 232 may be each be any suitable heating unit, for example a heat lamp such as an infra-red lamp. The heating units 232 may have any suitable shapes or configurations such as rectangular as shown in FIG. 2b. In other examples they may be circular, rod shaped, or bulb shaped, for example. The configuration may be optimized to provide a homogeneous heat distribution toward the area spanned by the build material. Each heating unit 232, or groups of heating units 232, may have an adjustable current or voltage supply to variably control the local energy density applied to the build material surface.

Each heating unit 232 may correspond to its own respective area of the build material, such that each heating unit 232 may emit heat substantially toward its own area rather than areas covered by other heating units 232. For example, each of the sixteen heating units 232 in FIG. 2b may heat one of sixteen different areas of the build material, where the sixteen areas collectively cover the entire area of the build material. However, in some examples, each heating unit 232 may also emit, to a lesser extent, some heat which influences an adjacent area.

Figure 2C:
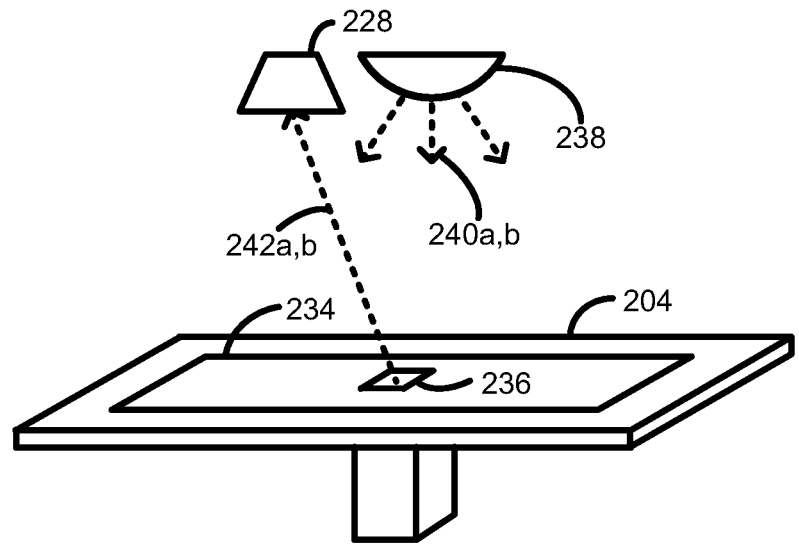
FIG. 2c is a simplified isometric illustration of a radiation sensor and an unfocused radiation source in an additive manufacturing system according to some examples.
Figure 2D:
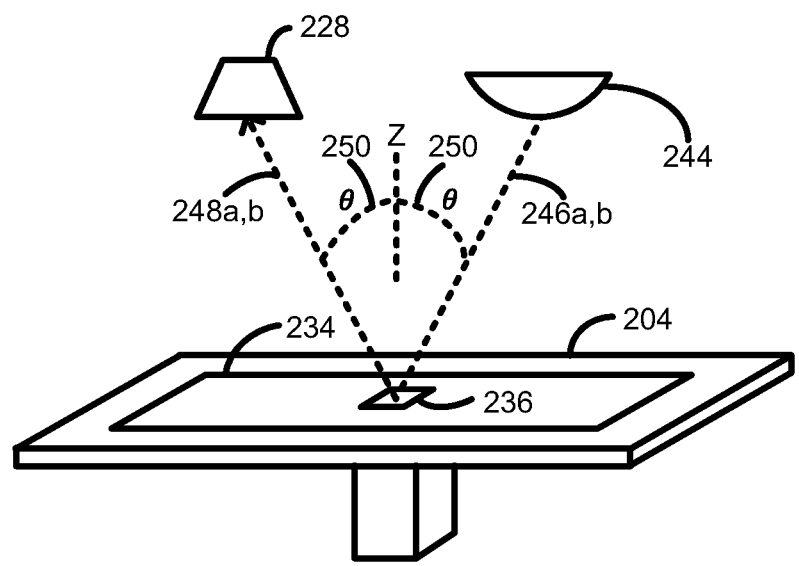
FIG. 2d is a simplified isometric illustration of a radiation sensor and a focused radiation source in an additive manufacturing system according to some examples.
Figure 2E:
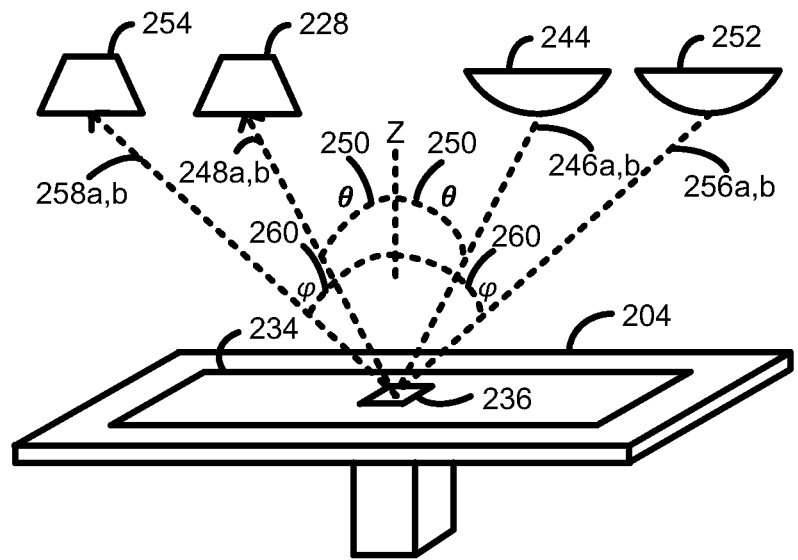
FIG. 2e is a simplified isometric illustration of two radiation sensors and two focused radiation sources in an additive manufacturing system according to some examples.

The system 200 may additionally include a radiation sensor 228 to measure absorbance or gloss of the build material, and/or changes to absorbance or gloss, for example upon a change in solidification of build material. The radiation sensor 228 may be to measure, e.g. capture, radiation reflected from the build material on the support member 204. At each area of the build material, the measurement of radiation may involve measuring a radiation distribution that is a spectral distribution comprising radiant intensity values as a function of radiation wavelengths. The radiation sensor 228 may also be to measure the angle of reflection of radiation from the build material. The radiation sensor 228 may output data representing the measurements to the controller 210, which may determine steps to be performed by the controller 210 if the build material has not solidified as intended. FIGS. 2c-e show various examples using a radiation sensor 228.

The radiation sensor 228 may, for example, be part of a reflectometer, densitometer, colorimeter, digital camera, gloss meter, or haze meter. The sensor itself may, for example, comprise a phototransistor, photodiode, light-to-voltage converter integrated circuit (e.g. a photodiode or phototransistor with support circuitry), contact image sensor, or charge coupled device. The radiation sensor 228 may also comprise lenses and/or filters to help collect and sort light when using any of the above sensors.

FIG. 2c is a simplified isometric illustration of a radiation sensor 228 and an unfocused radiation source 238 in the additive manufacturing system 200 according to some examples. In this example, the radiation sensor 228 may be used to measure absorbance. Thus, the radiation sensor 228 may, for example, be part of a reflectometer, densitometer, colorimeter, or digital camera. However, other types of sensors may be used. In these examples, the radiation sensor 228 may include or may be used with an unfocused radiation source 238. For example, if the radiation sensor 228 is a densitometer, the radiation sensor 228 may include the unfocused radiation source 238.

In some examples, the energy source 226 or the heater 230 may be used as the unfocused radiation source 238. In these examples, the radiation sensor 228 may, for example, include a filter to block a portion of the radiation, e.g. infra-red radiation, from the energy source 226 or the heater 230, such that the radiation sensor 228 detects a visible light tail of radiation reflected by the build material, but not infra-red radiation from the build material. Thus, the infra-red radiation used for heating or solidification of build material may not interfere with the visible light radiation used for detection of solidification.

In some examples, the unfocused radiation source 238 may be separate from the energy source 226 and the heater 230. In these cases, the radiation sensor 228 may similarly include a filter to block a portion of the radiation, e.g. infra-red radiation, from the energy source 226, heater 230, and the build material. Additionally, the unfocused radiation source 238 may, for example, apply radiation in a radiant spectrum that is substantially different than the radiant spectra applied by the energy source 226 and heater 230. For example, the unfocused radiation source 238 may apply radiation in the visible light range, whereas the energy source 226 and heater 230 may primarily apply radiation in the infra-red range. Thus, interference may be reduced or prevented between the infra-red radiation used for heating or solidification of build material and the visible light radiation used for detection of solidification.

To measure a change in absorbance, the radiation source 238 may apply unfocused radiation 240*a* to the build material 234, and a reference radiation distribution 242*a* reflected from an un-solidified portion 236 of the build material 234 may be measured by radiation sensor 228. Then, during or after applying energy to solidify the portion 236, when coalescing agent may be present in the portion 236, the radiation source 238 may again apply unfocused radiation 240*b* to the build material 234, and a post-energy radiation distribution 242*b* reflected from the now solidified portion 236 may be measured to indicate a post-energy absorbance. The wavelengths of the unfocused radiation 240*a* and 240*b* may be selected such that the radiation 240*a* and 240*b* is not absorbed when the portion 236 is not solidified, and such that the radiation 240*a* and 240*b* is absorbed when the portion is solidified 236 and/or contains coalescing agent therein. The coalescing agent may be selected, for example carbon black, such that it absorbs the wavelengths of the unfocused radiation. A comparison of the reference radiation distribution 242*a*, or the reference absorbance, and the post-energy radiation distribution 242*b*, or the post-energy absorbance, may be used to determine a change in the absorbance, which may indicate whether and to what extent the portion 236 has solidified. For example, the post-energy radiation distribution 242*b* having less intensity than the reference radiation distribution 242*a* may indicate that solidification has occurred.

In some examples, the reference radiation distribution 242*a* may instead be measured on a different portion than the portion 236 to be solidified. For example, the different portion may not be solidified at any stage, thus the measurement of the reference radiation distribution 242*a* on the different portion may be performed before, at the same time as, or after the measurement of the post-energy radiation distribution 242*b* of the portion 236 during or after the portion 236 is solidified. In yet other examples, the reference radiation distribution 242*a* may be a known quantity based on known properties of the build material 234 and system 200. Thus, only the post-energy radiation distribution 242*b* of the solidified portion 236 may be measured.

FIG. 2*d* is a simplified isometric illustration of a radiation sensor 228 and a focused radiation source 244 in an additive manufacturing system 200 according to some examples. In this example, the radiation sensor 228 may be used to measure gloss. Thus, the radiation sensor 228 may, for example, be part of a gloss meter, densitometer, reflectometer, or digital camera. However, other types of sensors may be used. In these examples, the radiation sensor 228 may include or may be used with a focused radiation source 244. In some examples, if the energy source 226 is a focused energy source, then it may be used as the focused radiation source 244. In some examples, the focused radiation source 244 may be separate from the energy source 226. In some examples, the focused radiation source 244 may, for example, apply radiation in a radiant spectrum that is substantially different than the radiant spectra applied by the energy source 226 and heater 230 to reduce or prevent interference between radiation used for heating or solidification of build material and radiation used for detection of solidification.

To measure a change in gloss, the radiation source 244 may apply focused radiation 246*a* to an un-solidified portion 236 of the build material 234 to be solidified at an angle (θ) 250 from the z-axis. To measure a reference gloss, the radiation sensor 228 may measure any of the radiation 248*a* that exhibits specular reflection at the opposite and equal angle (θ) 250 from the surface of the un-solidified portion 236. Then, to measure a post-energy gloss, during or after applying energy to solidify the portion 236, the radiation source 244 may again apply focused radiation 246*b* to the portion 236 of the build material 234 at the angle (θ) 250 from the z-axis, and the radiation 248*b* that exhibits specular reflection at the opposite and equal angle (θ) 250 from the surface of the portion 236 may be measured. Thus, the overall angular change in the reflected radiation may be twice the angle 250 (2θ). A comparison of the reference specular reflection, or the reference gloss, and the post-energy specular reflection, or the post-energy gloss, may be used to determine a change in the gloss, which may indicate whether and to what extent the portion 236 has solidified. For example, the radiation 248*b* having a greater intensity than the radiation 248*a* may indicate that solidification has occurred.

In some examples, in measuring gloss, the radiation source 244 may instead be unfocused, and the radiation sensor 228 may be fitted with apertures to filter out off-angle radiation. This may be acceptable because the reflection of unfocused radiation from the build material at the specular angle may substantially exceed radiation scattering from other angles received by the radiation sensor 228.

The radiation sensor 228 and the radiation source 244 may be arranged such that the angle (θ) 250 may take on any suitable value, for example any value greater than 0 degrees and less than 90 degrees, or between about 5 and about 85 degrees, or between about 15 and 75 degrees, or between about 20 and about 60 degrees, for example. Thus, the angle (θ) 250 may be non-zero.

In some examples, the reference specular reflection may instead be measured on a different portion than the portion 236 to be solidified. For example, the different portion may not be desired to be solidified, thus the measurement of the reference specular reflection on the different portion may be performed before, at the same time as, or after the measurement of the post-energy specular reflection of the portion 236 during or after the portion 236 is solidified. In yet other examples, the reference specular reflection may be a known quantity based on known properties of the build material 234 and system 200. Thus, only the post-energy specular reflection of the solidified portion 236 may be measured.

In some examples, the radiation sensor 244 may be part of a haze meter. These examples may be similar to above, except that in these examples, the radiation sensor 244 may instead be placed at a non-specular angle, such that it detects non-specular refection from the portion 236 to detect reference and post-energy radiation. In this case, the degree of non-specular reflection may negatively correlate with gloss of the portion 236, because it may be inferred that increased non-specular reflection correlates with decreased specular reflection.

FIG. 2*e* is a simplified isometric illustration of two radiation sensors 228 and 254 and two focused radiation sources 244 and 252 in an additive manufacturing system 200 according to some examples. FIG. 2*e* may include similar features as those in FIG. 2*d*, except for the additional radiation source 252 and additional radiation sensor 254. The radiation sensor 254 may, for example, be part of a gloss meter, densitometer, reflectometer, or digital camera. The radiation source 252 may apply focused radiation 256*a* and 256*b*, respectively prior to and after solidification, at an angle (φ) 260 from the z-axis to be specularly reflected by the portion 236 as radiation 258*a* and 258*b* at the opposite and equal angle (φ) 260. Thus, relative to the radiation sensor 228 and radiation source 244 described earlier, the specular reflection using radiation sensor 254 and radiation source 252 may be similar to and may be used similarly in determining solidification of the portion 236. Thus, two concurrent gloss measurements may be made involving specular reflection at different angles 250 and 260. Thus, reliability of the measurement may be increased, and errors due to unintended interference by other light sources may be reduced. In other examples, three or more radiation sensors and three or more radiation sources may be used to concurrently measure specular reflection at three or more different angles.

Figure 2F:
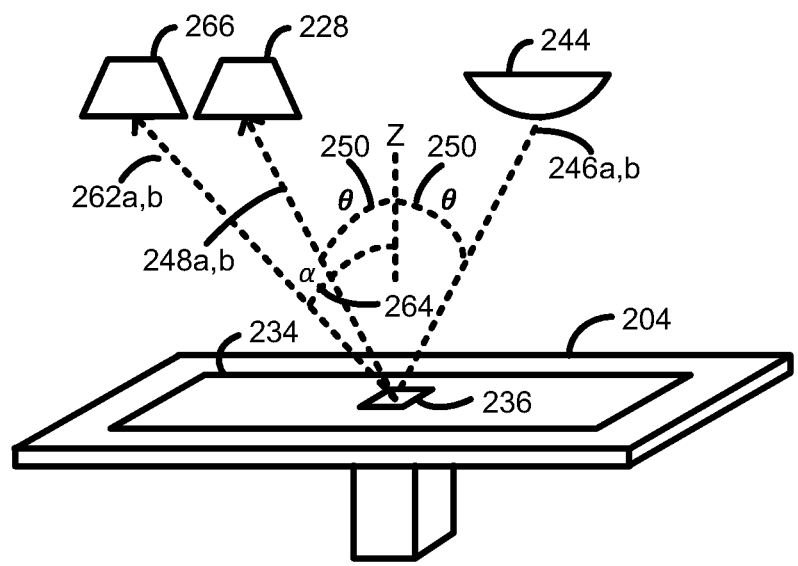
FIG. 2f is a simplified isometric illustration of two radiation sensors and a focused radiation source in an additive manufacturing system according to some examples.

FIG. 2f is a simplified isometric illustration of two radiation sensors 228 and 254 and a focused radiation source 244 in an additive manufacturing system 200 according to some examples. FIG. 2f may include similar features to those in FIG. 2d, except for the additional radiation sensor 266. The radiation sensor 266 may, for example, be part of a gloss meter, haze meter, densitometer, reflectometer, or digital camera. The radiation sensor 266 may be placed at a non-specular angle ($\alpha$) 264, i.e. an angle other than angle ($\theta$). In some examples, some of the radiation 246a and 246b may be non-specularly reflected as radiation 262a and 262b. The degree of non-specular reflection may be negatively correlated with solidification of the portion 236. Thus, the non-specular reflection may be used provide fine correction to the gloss measurement represented by the specular reflection, in the following ways. In some examples, a ratio between the magnitude of the detected radiation 248a and detected radiation 262a, or between the detected radiation 248a and detected radiation 262a, may provide a precise measure of gloss. In other examples, the radiation sensor 266 may measure stray radiation from other sources, for example the energy source 226. Thus, the measurement by radiation sensor 228 may be corrected to correct for unintended stray radiation, such that the radiation sensor 228 may accurately provide a measurement of specularly reflected radiation 248a and 248b.

In any of the examples above in which the wavelength(s) of the energy source 226 used to impart energy to the build material and the wavelength(s) of the radiation source used to measure the absorbance or gloss of the solidified material substantially overlap, a differential signal technique can be used to acquire a signal free of background radiation from the energy source 226. The radiation source used for measurement may apply radiation that is pulsed, i.e. turned on and off at a desired frequency, for example but not limited to a frequency selected from the range of 1 to 1000 Hz. The radiation sensor may measure a radiation distribution while the radiation source is on and may also measure a radiation distribution while the radiation source is off. These distributions may be compared, and the difference of these values may represent the desired quantity to be measured with the background radiation removed.

In any of the above examples, although measurement is shown relative to portion 236, other portions of the build material 234 may also be measured, for example the portions bordering to the portion 236.

Although in FIGS. 2a, 2c, 2d, 2e, and 2f, the energy source 226, heater 230, radiation sensors 228 and 254, and radiation sources 238, 244, and 252 are shown in particular locations above the support member 204, they may each be placed in any suitable location above or around the support member 214. In some examples, one or more of these components may be in a fixed location relative to the support member 204, but in other examples may be moveable if other components, when moving, disrupt the line of sight to the support member 204.

The controller 210 may control delivery of agents in accordance with agent delivery control data 208. For example, the controller 210 may control the selective delivery of coalescing agent to a layer of provided build material in accordance with instructions comprising coalescing agent delivery control data. Additionally, the controller 210 may control the selective delivery of coalescence modifier agent to a layer of provided build material in accordance with instructions comprising coalescence modifier agent delivery control data. The controller 210 may also control the energy source 226 to apply a variable amount of energy as it is moved across the layer of build material, for example in accordance with agent delivery control data 208.

The agent delivery control data 208 may define for each slice of the three-dimensional object to be generated the portions or the locations on the build material, if any, at which at least one of coalescing agent and coalescence modifier agent is to be delivered.

The coalescing agent delivery control data may be derived, for example, by a suitable three-dimensional object processing system. In some examples the three-dimensional object processing system may be comprised within the additive manufacturing system 200. For example, the instructions 218 may additionally include instructions that, when executed by the processor 212, cause the processor 212 to operate as a three-dimensional object processing system as described herein. In other examples the three-dimensional object processing system may be external to the additive manufacturing system 200. For example, the three-dimensional object processing system may be a software application, or part of a software application, executable on a computing device separate from the system 200.

In some examples, the coalescing agent delivery control data may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

In some examples, the coalescence modifier agent delivery control data may be generated or modified by the controller 210, while the object is generated, based on measured optical data received from the radiation sensor 228.

In some examples the object processing system may obtain data relating to characteristics of the additive manufacturing system 200. Such characteristics may include, for example, build material layer thickness, properties of the coalescing agent, properties of the coalescence modifier agent, properties of the build material, and properties of the energy source 226, properties of the heater 230, and properties of the temperature sensor 228.

The agent delivery control data 208 may describe, for each layer of build material to be processed, locations or portions on the build material at which coalescing agent is to be delivered. In one example the locations or portions of the build material at which coalescing agent is to be delivered are defined by way of respective patterns.

Figure 3:
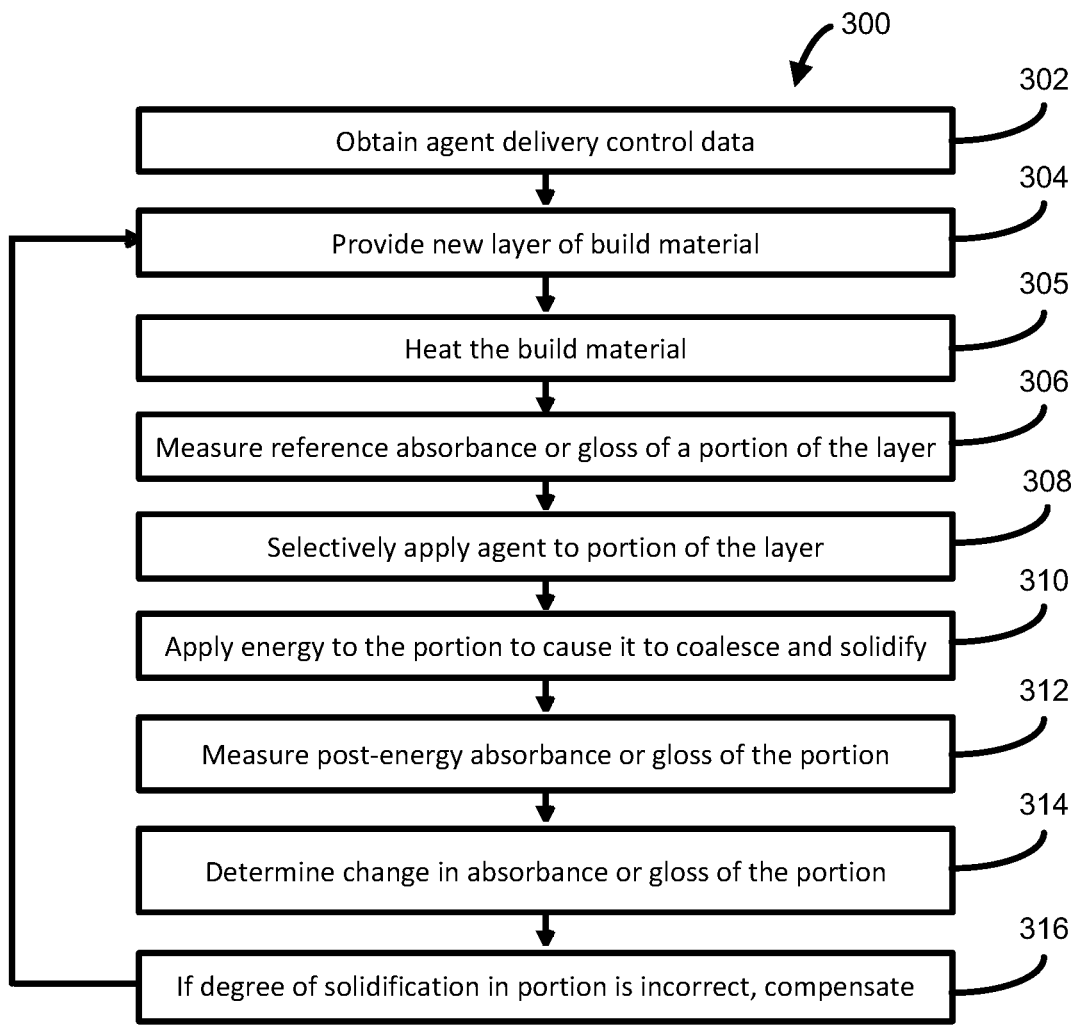

FIG. 3 is a flow diagram illustrating a method 300 of generating a three-dimensional object according to some examples. The method may be computer implemented. In some examples, the orderings shown may be varied, such that some steps may occur simultaneously, some steps may be added, and some steps may be omitted. In describing FIG. 3, reference will be made to FIGS. 2 and 4*a-h*. FIGS. 4*a-h* show a series of cross-sectional side views of layers of build material according to some examples.

At 302, the controller 210 may obtain agent delivery control data 208 such as the coalescing agent delivery control data.

Figure 4A:
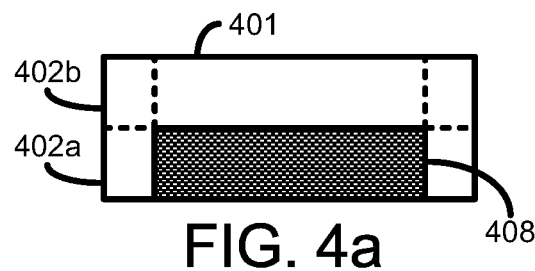
FIGS. 4a-e show a series of cross-sectional side views of layers of build material according to some examples.

At 304, a layer 402*b* of build material may be provided, as shown in FIG. 4*a*. For example, the controller 210 may control the build material distributor 224 to provide the layer 402*b* on a previously completed layer 402*a* on the support member 204 by causing the build material distributor 224 to move along the y-axis as discussed earlier. The completed layer 402*a* may include a solidified portion 408. Although a completed layer 402*a* is shown in FIGS. 4*a-d* for illustrative purposes, it is understood that the steps 304 to 316 may initially be applied to generate the first layer 402*a*.

At 305, the build material may be heated by the heater 230 to heat and/or maintain the build material within a predetermined temperature range. The predetermined temperature range may, for example, be below the temperature at which the build material would experience bonding in the presence of coalescing agent 404, for example below the melting point of the build material. For example, the predetermined temperature range may be between about 155 and about 160 degrees Celsius, or the range may be centered at about 160 degrees Celsius. If the build material is crystalline or semi-crystalline, the predetermined temperature range may be between the crystallization temperature and the melting point of the build material. Other temperature ranges may be used depending on the type of build material. Pre-heating may help reduce the amount of energy that has to be applied by the energy source 226 to cause coalescence and subsequent solidification of build material on which coalescing agent has been delivered or has penetrated.

At 306, a reference absorbance and/or a reference gloss of the surface of one or more portions 401 to be solidified of the layer 402*b* of build material may be measured. The measurement may be made according to any of the techniques described earlier relative to FIGS. 2*a-2f*, for example using the radiation source 238, 244, and/or 252, and the radiation sensor 228 and/or 254. The radiation sensor 228 and/or 254 may output data representing the measured reference absorbance and/or reference gloss to the controller 210.

In some examples, as discussed earlier, the reference absorbance and/or reference gloss may instead be measured on a different portion than the portions 401 to be solidified. The different portion may not be desired to be solidified. In these examples, the reference measurements may be made at 306, or may be made during 310 and/or at 312, for example at the same time as the post-energy measurement to be made at 312. In other examples, the reference absorbance and/or reference gloss may be predetermined and stored in the controller 210, for example based on known characteristics of the build material or prior measurements of the type of build material being used.

In some examples, any of the above reference measurements may instead be made after delivering coalescing agent at 308. For example, in some examples, as discussed earlier, the coalescing agent may increase the absorbance of un-solidified build material, thus the appropriate comparison to determine a change in absorbance resulting from applying energy may be to compare a reference absorbance of build material having coalescing agent and a post-energy absorbance of build material having coalescing agent.

Figure 4B:
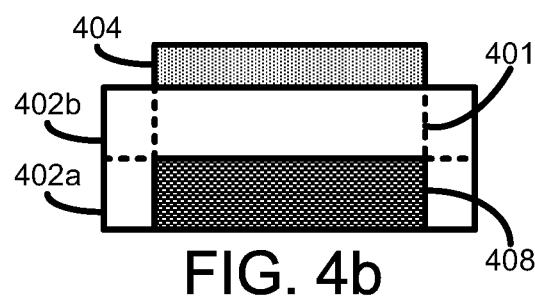

At 308, as shown in FIG. 4*b*, a coalescing agent 404 may be selectively delivered to the surface of the one or more portions 401 of the layer 402*b* at which the reference absorbance and/or reference gloss were measured. As discussed earlier, the agent 404 may be delivered by agent distributor 202, for example in the form of fluids such as liquid droplets.

The selective delivery of the agent 404 may be performed in patterns on the portions 401 of the layer 402*b* that the agent delivery control data 208 may define to become solid to form part of the three-dimensional object being generated. "Selective delivery" means that agent may be delivered to selected portions of the surface layer of the build material in various patterns. The patterns may be defined by the agent delivery control data 208.

Figure 4C:
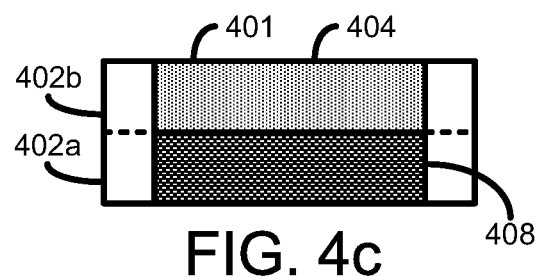

FIG. 4*c* shows coalescing agent 404 having penetrated substantially completely into the portions 401 of the layer 402*b* of build material, but in other examples, the degree of penetration may be less than 100%. The degree of penetration may depend, for example, on the quantity of agent delivered, on the nature of the build material, on the nature of the agent, etc.

However, in some examples, coalescing agent 404 may not be delivered, for example if the solidification of build material is achieved using a focused energy source.

At 310, a predetermined level of energy may be temporarily applied to the layer 402*b* of build material. In various examples, the energy applied may be infra-red or near infra-red energy, microwave energy, ultra-violet (UV) light, halogen light, ultra-sonic energy, or the like. The length of time the energy is applied for, or energy exposure time, may be dependent, for example, on one or more of: characteristics of the energy source; characteristics of the build material; and characteristics of the coalescing agent. The type of energy source used may depend on one or more of: characteristics of the build material; and characteristics of the coalescing agent. In one example, the energy may be applied for a predetermined length of time.

Figure 4D:
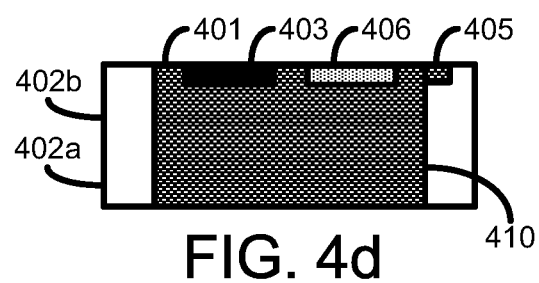

The temporary application of energy may cause the portions 401 of the build material to heat up above the melting point of the build material and to coalesce. In some examples, the energy source may be focused, and coalescing agent 404 may not have been provided at 308. In other examples, the energy source may be unfocused, and the temporary application of energy may cause the portions 401 of the build material on which coalescing agent 404 has been delivered or has penetrated to heat up above the melting point of the build material and to coalesce. For example, the temperature of some or all of the layer 402*b* may achieve about 220 degrees Celsius. Upon cooling, the portion 401 may coalesce may become solid and form part of the three-dimensional object being generated, as shown in FIG. 4*d*.

As discussed earlier, one such solidified portion 408 may have been generated in a previous iteration. The heat absorbed during the application of energy may propagate to the previously solidified portion 408 to cause part of portion 408 to heat up above its melting point. This effect helps creates a portion 410 that has strong interlayer bonding between adjacent layers of solidified build material, as shown in FIG. 4d.

However, in some examples, defects may be present in the layer 402b, including the portion 401. Some example defects are shown in FIG. 4d. In one example, parts 406 in the portion 401 may not have solidified as intended at 310. For example, the parts 406 may not have received enough energy to heat and thus coalesce and solidify, or insufficient coalescing agent 404 may have been delivered. Thus, non-solidified build material parts 406 may remain in the portion 401. In another example, parts 403 may have solidified to a greater extent than desired. For example, the parts 403 may have received too much heat or too much coalescing agent 404 may have been delivered to the parts 403. In another example, coalescence bleed may occur, for example in part 405, which may be undergoing undesired solidification, may extend from portion 401. Although the parts 406, 403, and 405 are shown together in layer 402b for illustrative purposes in FIG. 4d, these parts may not all be present in the same layer.

At 312, a post-energy absorbance and/or a post-energy gloss of the surface of the portions 401 of the layer 402b of build material may be measured. In some examples, as discussed earlier, the measurement may be made after or during applying the energy at 310. The measurement may be made according to any of the techniques described earlier relative to FIGS. 2a-2f, for example using the radiation source 238, 244, and/or 252, and the radiation sensor 228 and/or 254. The radiation sensor 228 and/or 254 may output data representing the measured post-energy absorbance and/or post-energy gloss to the controller 210.

At 314, based on the data representing the reference and post-energy measurements of absorbance and/or gloss, the controller 210 may determine a change or difference in absorbance and/or gloss. Effectively, these determinations provide calibrated absorbance and/or gloss measurements. The change or difference in absorbance and/or gloss may be made by comparing the difference between the reference and post-energy measurements, as discussed earlier. The change or difference in absorbance and/or gloss may indicate if a part of the layer 402b and/or portion 401 did not solidify as intended and/or the degree to which the parts of the layer 402b and/or the portion 401 have solidified. For example, the change or difference in absorbance and/or gloss may indicate that part 406 has under solidified e.g. not solidified as intended, that part 403 has over-solidified e.g. solidified more than intended, and that part 405 is experiencing over-solidification e.g. undesired solidification. As discussed earlier, the determination may be made during rather than after applying the energy at 310.

In some examples, 312 and 314 may be looped throughout the method 300 to provide continuous feedback, including while applying the energy at 310 and/or after applying the energy at 310. In other examples, 312 and 314 may be performed at specific times in an iteration of the method 300, such as once or twice for each layer. For example, 312 and 314 may be performed once during applying energy at 310 and/or once after applying energy at 310.

At 316, if defects are present in the layer 402b of build material, the controller 210 may determine one or more steps of modifying a process parameter and may, based thereon, control the apparatus to modify the process parameter to correct the defects. As discussed earlier, the modification may be made during or after applying the energy at 310. Any suitable combination of the following example modification steps may be performed to achieve desired degrees of solidification for all of the build material.

In some examples, modifying a process parameter may comprise controlling, by the controller 210, the application of energy by the energy source 226.

In some examples, such as if the modification is made during applying energy at 310, modifying a process parameter may comprise (1) continuing to apply energy at 310 to achieve sufficient solidification of part 406 at which point the application of energy may be terminated; or (2) terminating application of energy if it is detected that part 403 is over-solidifying or part 405 is undesirably solidifying. In examples in which feedback of 312 to 314 is continuously provided, the energy may be continually applied or terminated, as above, until feedback indicates at 314 that correction has been achieved. In some examples, an energy source 226 is used that is slow to respond to instructions from the controller 210 to terminate application of energy, e.g. the energy source 226 experiences inertia. In these examples, the controller 210 may instruct the energy source 226 to terminate energy prior to the desired solidification is achieved, such that the energy source 226 continues, after receiving instructions, to briefly apply energy while shutting down, such that the desired solidification is achieved. In so doing, the controller 210 may rely on a predictive model defining an expected solidification based on time of instruction, by the controller 210, to terminate energy. The predictive model may, for example, be based on prior measurements of solidification based on the time that termination of energy is instruction by the controller 210. In examples in which feedback of 312 to 314 is at fixed times on a layer-by-layer basis rather than continuous, the energy may be continuously applied for an additional time period determined by the controller 210 to be sufficient to achieve correction and a desired level of solidification for the parts.

In some examples, such as if the modification is made after applying energy at 310, modifying a process parameter may comprise applying a second temporary application of energy to achieve sufficient solidification of part 406 at which point the application of energy may be stopped e.g. terminated. In examples in which feedback of 312 to 314 is continuously provided, the second application of energy may be continually applied until feedback indicates at 314 that solidification has occurred. In examples in which feedback of 312 to 314 is at fixed times on a layer-by-layer basis rather than continuous, the second application of energy may be applied for an additional time period determined by the controller 210 to be sufficient to cause solidification of part 406.

In any of the above examples, intensity of the energy applied may be varied, for example increased or decreased, in addition to or instead of varying the duration of the application of energy.

In some examples, to enhance coalescence and solidification in the part 406, modifying a process parameter may also comprise selectively delivering, to the part 406, coalescing agent additional to the coalescing agent 404 and/or coalescence modifier agent such as a plasticizer that enhances coalescence. Thus, the part 406 may coalesce and solidify more easily when additional energy is applied. In other examples, the additional coalescing agent and/or the coalescence modifier agent may be delivered to part 406 without any additional application of energy. Instead, the application of energy after the next layer of build material is deposited may cause the part 406 to coalesce and solidify due to the coalescence enhancing effects of the additional coalescing agent and/or coalescence modifier agent.

In some examples, to reduce coalescence and solidification in the parts 403 and/or 405, modifying a process parameter may also comprise selectively delivering, to the parts 403 and/or 405, coalescence modifier agent that is selected to reduce coalescence. Thus, for example, if the parts 403 and/or 405 are still coalescing, then they may exhibit reduced coalescence and/or solidification such that solidification of part 403 is reduced to a level desired, and little or no solidification of part 405 ultimately occurs. In some examples, even if some solidification occurs in part 405, it may not be sufficiently solidified to remain rigid and attached to the portion 410, thus it can be separated from the completed three-dimensional object when the completed object is removed from the un-solidified build material. In some examples, the coalescence modifier agent may provide a cooling effect to cause the parts on which it is delivered to be cooled.

In some examples, to correct the defective parts 406, 403, and/or 405, modifying a process parameter may comprise varying, for example increasing or decreasing, the intensity or duration of the application of energy after the next layer of build material is deposited, relative to if modify a process parameter was not to be performed.

In some examples, to correct the defective parts 406, 403, and/or 405, modifying a process parameter may comprise varying temperature of the build material. For example, modifying a process parameter may comprise varying the speed of the method 300, for example by increasing or decreasing time delays between any of the steps in one or more iterations of method 300. Time delays may be varied between providing a layer of build material, delivering agents, and applying energy, for example. Increasing time delays may allow the build material to cool, for example by radiative or convective cooling, such that coalescence and solidification is decreased to correct defects such as in part 406. Decreasing time delays may delay or may reduce the ability of the build material to cool. Thus, the degree of coalescence and solidification may be decreased to correct defects such as in parts 403 and 405. In some examples, modifying a process parameter may include varying, for example increasing or decreasing, the amount of heat provided by the heater 230 at 305, so as to correct the defects in the parts.

In some examples, modifying a process parameter may comprise controlling the build material distributor 224 to vary the thickness of one or more layers, so as to modify coalescence in the layers. For example, variable coalescence and solidification may be achieved depending on thickness of a deposited layer.

Figure 4E:
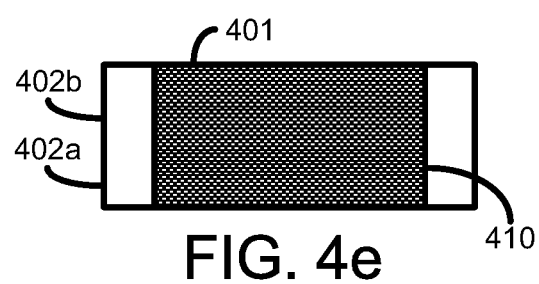

In some examples, such as if modification is made prior to delivering the next layer, then the defects may be reduced or substantially eliminated, as shown in FIG. 4e.

After a layer of build material has been processed as described above in 304 to 316, new layers of build material may be provided on top of the previously processed layer of build material. In this way, the previously processed layer of build material acts as a support for a subsequent layer of build material. The process of 304 to 316 may then be repeated to generate a three-dimensional object layer by layer.

The examples herein may be cost-effective, for example radiation sensors may be inexpensive. The examples herein may also be passive and non-destructive, in that no physical contact may be made with the build material during detection of optical properties. Additionally, the radiation sensors herein may, in some examples, provide high resolution absorbance data and gloss data of the build material. Thus, precise and accurate control of the build may be achieved using feedback from such radiation sensors. The absorbance and gloss measurements may also, in some examples, be generally unaffected by changes in temperature or thermal properties of the build material throughout the build. Further, the measurements may, in some examples, be easily calibrated using a reference measurement prior to applying energy to cause solidification of build material. Thus, no external calibration techniques may be required. The following examples may achieve one or more of these effects.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. An apparatus for generating a three-dimensional object, the apparatus comprising:
a radiation sensor to measure absorbance of build material; and
a controller to:
control an energy source to apply energy to a layer of the build material to cause a portion of the layer to coalesce and solidify to form a slice of the three-dimensional object;
receive, from the radiation sensor, data representing measured absorbance of the portion of the layer;
determine whether the measured absorbance of the portion of the layer is indicative of an incorrect degree of solidification of a part of the layer; and
control the apparatus to modify a process parameter in response to determining the measured absorbance is indicative of the incorrect degree of solidification of the part of the layer.

2. The apparatus of claim 1 wherein the controller is to control an agent distributor to selectively deliver coalescing agent to the portion to cause the portion to coalesce when the energy is applied.

3. The apparatus of claim 2 wherein the radiation sensor is to measure the absorbance of the build material, wherein the coalescing agent is to absorb unfocused radiation used for measuring the absorbance, the unfocused radiation being received from the energy source or another radiation source.

4. The apparatus of claim 1 wherein the radiation sensor is part of a reflectometer, densitometer, colorimeter, digital camera, gloss meter, or haze meter.

5. The apparatus of claim 1 wherein the controller is to control the apparatus to modify the process parameter if the measured absorbance indicates that the part has under-solidified, the under-solidified part being in the portion that is to form the slice of the three-dimensional object.

6. The apparatus of claim 1 wherein the controller is to control the apparatus to modify the process parameter if the measured absorbance indicates that the part has over-solidified.

7. The apparatus of claim 1 further comprising an unfocused radiation source to apply unfocused radiation to the build material, the build material to reflect the unfocused radiation for detection by the radiation sensor to measure the absorbance of the build material, the unfocused radiation having a substantially different radiant spectrum than the energy applied by the energy source.

8. The apparatus of claim 1 further comprising a focused radiation source to apply focused radiation to the build material, the build material to reflect the focused radiation for detection by the radiation sensor to measure the specular reflection or gloss of the build material, the focused radiation having a substantially different radiant spectrum than the energy applied by the energy source.

9. The apparatus of claim 1 further comprising:
a first focused radiation source to apply first focused radiation to the build material at a first non-zero angle, the build material to specularly reflect the first focused radiation for detection by the radiation sensor to measure the gloss of the build material; and
a second radiation sensor to measure any of the first focused radiation that is reflected at a non-specular angle,
prior to controlling the apparatus to modify the process parameter, the controller to correct the gloss measurement by the first radiation sensor using the measurement by the second radiation sensor of the first focused radiation that is non-specularly reflected,
if the measured gloss, after being corrected, indicates the incorrect degree of solidification of the part of the layer, control the apparatus to modify the process parameter.

10. The apparatus of claim 1 wherein:
to measure the absorbance of the portion, the radiation sensor is to measure a reference absorbance or reference gloss of the portion prior to applying the energy to the portion, and is to measure a post-energy absorbance or post-energy gloss of the portion during or after applying the energy to the portion, and
the controller is to compare the reference absorbance or reference gloss and the post-energy absorbance or post-energy gloss to determine a calibrated absorbance or calibrated gloss, and to control the apparatus to modify the process parameter based on the calibrated absorbance or calibrated gloss.

11. The apparatus of claim 1 wherein modifying the process parameter comprises controlling an agent distributor to selectively deliver coalescence modifier agent to the part.

12. The apparatus of claim 1 wherein modifying the process parameter comprises the controller to control the energy source to vary temperature of the build material or vary duration or intensity of the energy applied to the build material.

13. The apparatus of claim 1 further comprising a radiation source to apply pulsed radiation to the build material, the build material to reflect the pulsed radiation for detection by the radiation sensor such that the detected pulsed radiation when the radiation source is in the on-state is compared by the radiation sensor or controller with detected background radiation when the radiation source is in the off-state, the comparison used to remove background noise from the measurement of the absorbance.

14. An apparatus for generating a three-dimensional object, the apparatus comprising:
a radiation sensor to measure absorbance of build material; and
a controller to:
control an energy source to apply energy to a layer of the build material to cause a portion of the layer to coalesce and solidify to form a slice of the three-dimensional object;
control the energy source or an unfocused radiation source to apply unfocused radiation to the build material,
receive, from the radiation sensor, data representing the measured absorbance of the portion of the layer, the measured absorbance based on detection by the radiation sensor of an amount of the unfocused radiation that is reflected by the build material;
determine whether the measured absorbance or measured gloss of the portion of the layer is indicative of an incorrect degree of solidification of a part of the layer; and
in response to determining the measured absorbance is indicative of the incorrect degree of solidification of the part of the layer, control the apparatus to modify a process parameter.

15. The apparatus of claim 14 wherein the controller is to determine measured gloss of the portion of the layer, and is to determine whether the measured gloss of the portion of the layer is indicative of the incorrect degree of solidification of the part of the layer.

16. The apparatus of claim 14 wherein the controller is to control an agent distributor to selectively deliver coalescing agent to the portion to cause the portion to coalesce when the energy is applied.

17. The apparatus of claim 16 wherein the coalescing agent is to absorb unfocused radiation used for measuring the absorbance, the unfocused radiation being received from the energy source or another radiation source.

18. The apparatus of claim 14 further comprising an unfocused radiation source to apply unfocused radiation to the build material, the build material to reflect the unfocused radiation for detection by the radiation sensor to measure the absorbance of the build material, the unfocused radiation having a substantially different radiant spectrum than the energy applied by the energy source.

19. The apparatus of claim 1 wherein the controller is to determine measured gloss of the portion of the layer, and determines whether the measured gloss of the portion of the layer is indicative of the incorrect degree of solidification of the part of the layer.

20. The apparatus of claim 1 wherein the energy applied by the energy source comprises unfocused radiation applied to the build material, and the measured absorbance is based on detection by the radiation sensor of an amount of the unfocused radiation that is reflected by the build material.

* * * * *